Dec. 1, 1953   B. J. SLAUGHTER, JR   2,661,229
SEALING GASKET
Filed Dec. 2, 1950   2 Sheets-Sheet 1
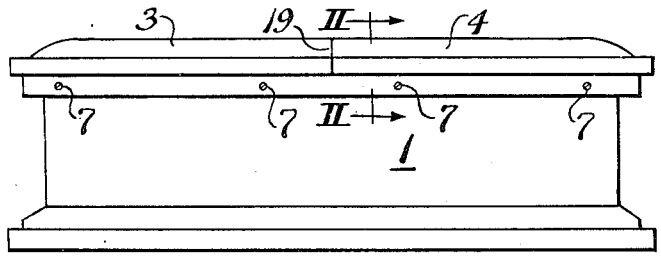
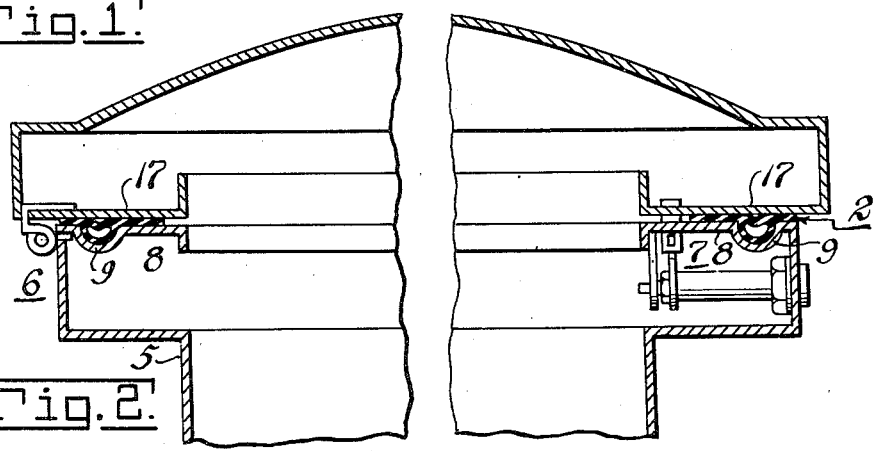
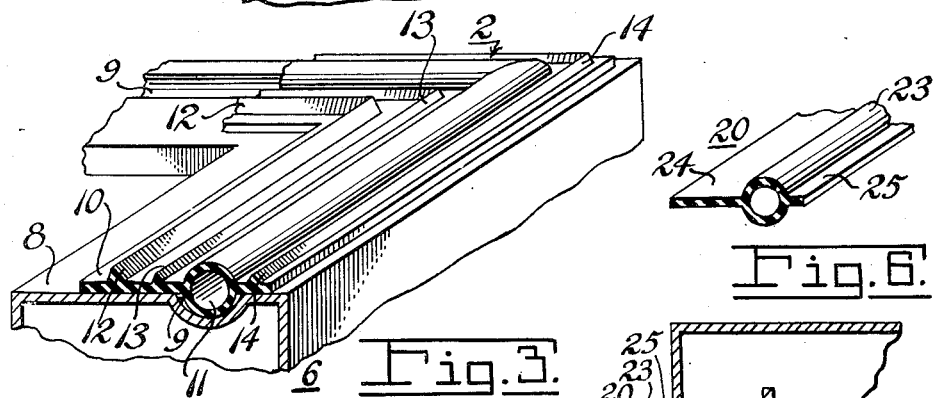
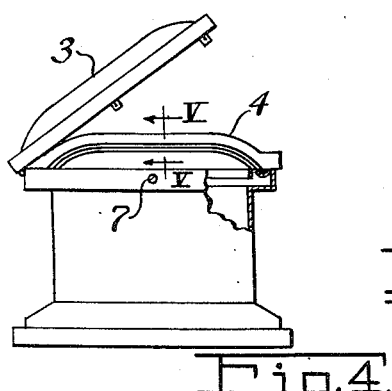
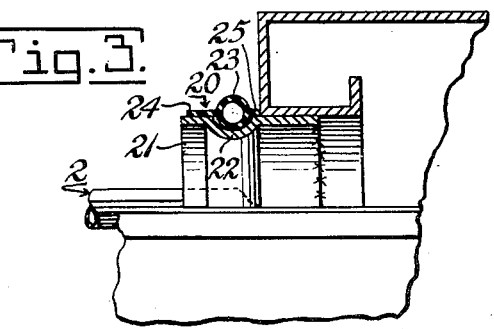
INVENTOR.
BERNARD J. SLAUGHTER, JR.
BY Zugelter & Zugelter
Attys.

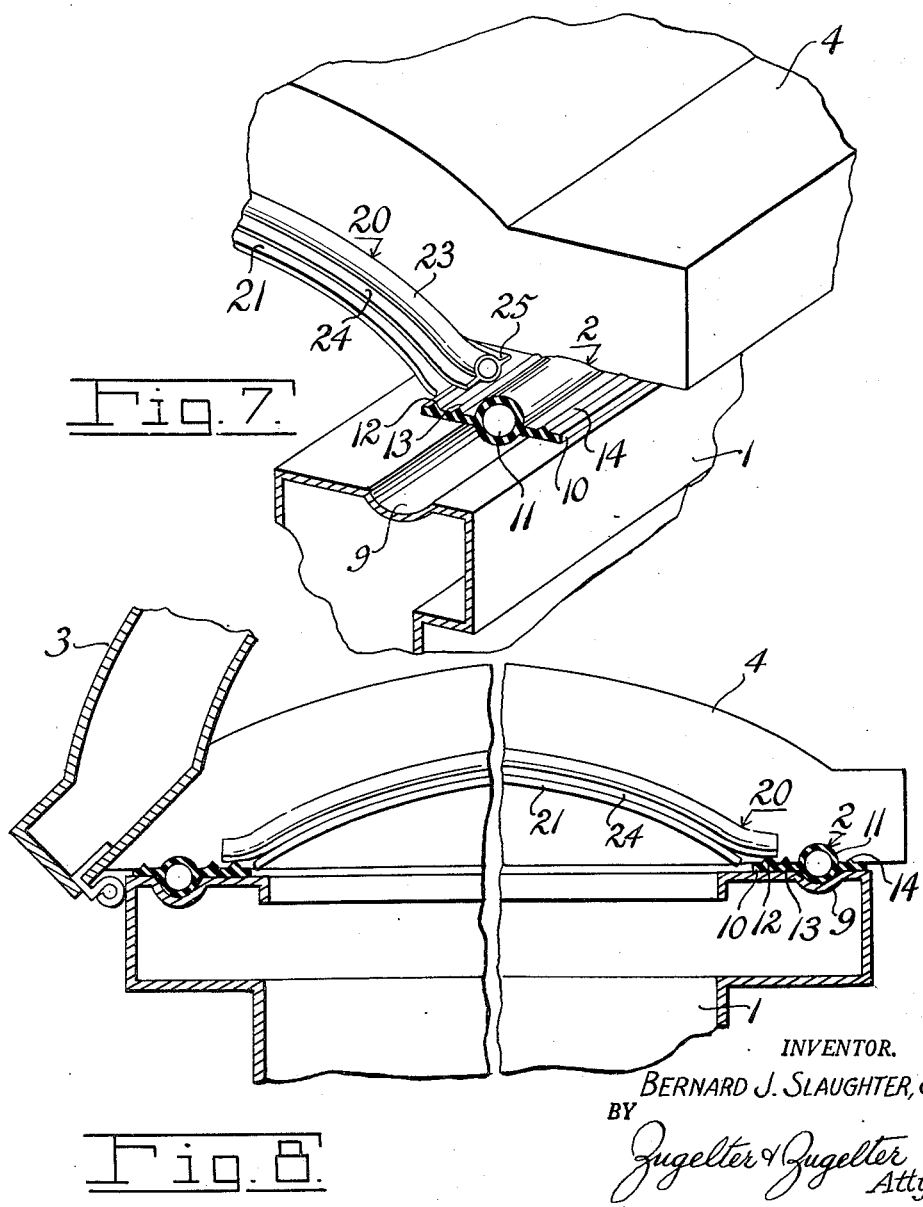

Patented Dec. 1, 1953

2,661,229

UNITED STATES PATENT OFFICE 2,661,229

SEALING GASKET

Bernard J. Slaughter, Jr., Cincinnati, Ohio, assignor to The Crane & Breed Casket Company, Cincinnati, Ohio, a corporation of Ohio Application December 2, 1950, Serial No. 198,827

1 Claim. (Cl. 288—23)

This invention relates to gaskets and more particularly to gaskets for sealing the joint between the lid and body of a casket and the transverse joint between two lid sections of a casket.

An object of this invention is to provide a relatively wide gasket having an integral hollow tubular section located between the inner and outer edges thereof whereby a seal is effected by the marginal portions as well as by the tubular section.

Another object is to provide a gasket such as above set forth, having ribs on one face of the gasket that parallel the tubular section, the ribs providing additional sealing action.

The above and other objects of the invention will be apparent to those skilled in this art from the following description taken in conjunction with the accompanying drawings in which:

Figure 1 is a more or less diagrammatic view in side elevation of a casket to which a gasket embodying the invention may be applied;

Fig. 2 is a view in section taken on line II—II of Fig. 1;

Fig. 3 is a view in perspective of a corner of a casket having thereon a gasket embodying the invention, the gasket being shown to full scale;

Fig. 4 is an end view of a two lid section casket, one lid section being open;

Fig. 5 is a view in section taken on line V—V of Fig. 4 showing the transverse gasket in place;

Fig. 6 is a view in perspective, approximately to full scale, of a section of the transverse gasket;

Fig. 7 is an enlarged fragmentary perspective view partly in section showing a portion of the casket body and one lid section in closed position, the marginal gasket being partly broken away; and Fig. 8 is a fragmentary view in transverse section of the casket with one lid section closed and the other lid section open.

Figs. 1 and 2 of the drawings show the relative dimensions of the sides and ends of a casket 1 provided with a marginal gasket 2 embodying a form of the invention. The lid of the casket may be in one assembly or divided to form head and foot sections 3 and 4 as shown.

The marginal gasket 2 is unitary and rectangular so that when placed it extends along the sides and ends of the body 5 of the casket as shown. The top of the body of the casket is provided with a three-sided hollow box-like flange 6 extending around the periphery of the casket and contains the latch mechanisms 7 by means of which the lids are pulled down upon the body and clamped thereto. The upper or top wall 8 of flange 6 is formed with a groove 9 adjacent the outer wall thereof, the groove being continuous about the periphery of the casket body.

The marginal or peripheral gasket 2 comprises a relatively wide strip 10 of rubber or rubber-like material having a hollow tubular section 11 unitary with the strip and disposed inwardly of the longitudinal edges of the strip. In the preferred form of strip the tubular section 11 is located between the center line or major axis of the strip and its outer edge so that it is closer to the outer than the inner edge thereof. The diameter of the tubular section may be about one-third of the width of the strip.

In order to improve and supplement the sealing function of the strip and its tubular section 11, the upper face of the strip may be provided with a plurality of upwardly projecting spaced ribs 12, 13 and 14. Ribs 12 and 13 are located on the inner portion of the strip between its inner edge and the tubular section, and rib 14 is located between the tubular section 11 and the outer edge of the strip. It is preferred that rib 12 be higher than ribs 13 and 14. In practice rib 12 may be made about $\frac{3}{32}$" high, and ribs 13 and 14 about $\frac{1}{16}$" high.

When the marginal gasket is placed as shown in Fig. 3 and the lid sections are pulled down and latched as shown in Fig. 2, the tubular section 11 is seated in groove 9 and the sections on opposite sides thereof are clamped between the body flange 6 and the abutting border flange 17 of the lid. The ribs 12, 13 and 14 are squeezed down also. When the lids are closed, the ribs form barriers on either side of the tubular section to seepage of water in a direction transversely of the gasket. The ribs 12, 13 and 14 also so improve the sealing function of the gasket that fewer latch mechanisms 7 are required to effectively clamp the lid, whether in one or two sections, onto the body of the casket.

In the case where the lid is composed of hinged head and foot sections 3 and 4, as shown, the same type of gasket may be employed to seal the transverse joint 19. Such a gasket is shown at 20 in Figs. 4, 5, 6, 7 and 8. The foot section 4 is provided with a transverse flange 21 having a groove 22 therein. Gasket 20 is laid on flange 21 so that the tubular section 23 thereof lies in groove 22. The flat portions 24 and 25 of the gasket strip on opposite sides of the tubular section provide additional sealing surface. The ends of the transverse gasket 20 terminate at and rest upon the inner portion of the marginal gasket on which ribs 12 and 13 are formed (Figs.

7 and 8). When the head section 3 is closed and latched shut, the transverse gasket is clamped at joint 19 (Fig. 1) between the under side of the head section 3 and flange 21. When so clamped, the inner rib 12 of the marginal gasket projects upwardly behind the transverse gasket thereby providing a barrier to seepage at the contact points between the marginal gasket and the ends of the transverse gasket.

The transverse gasket 20 may be provided with ribs such as ribs 12, 13 and 14, if desired.

Latch mechanism 7 may be of the type shown, described and claimed in United States Patent #2,506,553, issued May 5, 1950, and as specifically shown and described in my co-pending application Serial No. 136,731, filed January 4, 1950, now Patent No. 2,607,102, issued August 19, 1952.

Having thus described the invention, it will be apparent to those skilled in this art, that various changes may be made in the illustrated embodiment thereof, without departing from either the spirit or the scope of the invention.

Therefore, what is claimed as new and desired to be secured by Letters Patent is:

A one piece marginal gasket adapted to extend around the periphery of the body of a casket and form a seal between the casket lid and body comprising a rectangular member having side and end members unitarily connected at the corners and composed of a relatively wide strip of rubber-like material having a hollow tubular section disposed between the center-line of the strip and the outermost edge thereof, the tubular section being integral with the strip, said strip having on the lid seating face between the tubular section and the outermost edge an upwardly projecting solid rib that is parallel to said edge, said strip having on said seating face between the innermost edge and said tubular section, upwardly projecting spaced solid ribs extending parallel to said innermost edge, the rib adjacent said innermost edge being higher than said other ribs, the tubular section being higher than the ribs.

BERNARD J. SLAUGHTER, Jr.

References Cited in the file of this patent

UNITED STATES PATENTS

| Number | Name | Date |
|---|---|---|
| 70,910 | Somes | Nov. 12, 1867 |
| 1,883,609 | Dennis | Oct. 18, 1932 |
| 2,043,652 | Carr | June 9, 1936 |
| 2,215,889 | Swedman | Sept. 24, 1940 |
| 2,284,921 | Purkiss | June 2, 1942 |
| 2,345,273 | Macklanburg | Mar. 28, 1944 |
| 2,533,827 | McEwan | Dec. 12, 1950 |

FOREIGN PATENTS

| Number | Country | Date |
|---|---|---|
| 475,755 | Great Britain | of 1937 |